(12) United States Patent
Meyers

(10) Patent No.: US 9,336,505 B1
(45) Date of Patent: May 10, 2016

(54) APPARATUS FOR PORTAL BASED SCANNING

(75) Inventor: Richard C. Meyers, Longboat Key, FL (US)

(73) Assignee: GlobalTrak, LLC, Dulles, VA (US)

( * ) Notice: Subject to any disclaimer, the term of this patent is extended or adjusted under 35 U.S.C. 154(b) by 771 days.

(21) Appl. No.: 13/310,659

(22) Filed: Dec. 2, 2011

Related U.S. Application Data

(60) Provisional application No. 61/420,239, filed on Dec. 6, 2010.

(51) Int. Cl.
*H04Q 5/22* (2006.01)
*G06Q 10/08* (2012.01)
*G08B 13/19* (2006.01)
*B66C 13/16* (2006.01)

(52) U.S. Cl.
CPC ............... *G06Q 10/08* (2013.01); *B66C 13/16* (2013.01); *G08B 13/19* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,665,585 B2 * | 12/2003 | Kawase | ............... | G06K 7/0008 414/137.1 |
| 6,768,931 B2 * | 7/2004 | Takehara | ............. | G06Q 10/087 414/140.3 |
| 7,188,513 B2 * | 3/2007 | Wilson | ................. | G01N 1/2226 73/31.01 |
| 7,216,806 B2 * | 5/2007 | Kurita | .................... | G06Q 10/08 235/375 |
| 7,427,918 B2 * | 9/2008 | Fano | ...................... | G08B 25/10 235/385 |
| 7,987,017 B2 * | 7/2011 | Buzzoni | ............... | B65G 63/004 414/803 |
| 9,177,462 B1 * | 11/2015 | Meyers | .................. | G08B 23/00 |
| 2005/0080520 A1 * | 4/2005 | Kline | ........................ | B03B 9/06 701/1 |
| 2006/0153455 A1 * | 7/2006 | Takehara | ............. | B66C 19/007 382/181 |
| 2008/0018430 A1 * | 1/2008 | Yamazoe et al. | ............. | 340/10.1 |

* cited by examiner

*Primary Examiner* — Jennifer Mehmood
*Assistant Examiner* — Rufus Point

(57) ABSTRACT

A system, apparatus, and method for the rapid inspection of shipping containers during transport and for intelligent data gathering for risk analysis are provided. More specifically, a portal based scanner is disclosed which includes a plurality of sensors positioned to create a target zone so that the shipping containers can be automatically scanned during loading and offloading operations. According to one aspect of the invention, the scanner is capable of wirelessly communicating with the containers, gathering data about each container, and reporting data to a Data Fusion Center for risk profile analysis.

13 Claims, 3 Drawing Sheets

APPARATUS FOR PORTAL BASED SCANNING

PRIORITY CLAIM

The present invention claims priority to U.S. Provisional Application No. 61/420,239, filed Dec. 6, 2010.

BACKGROUND OF THE PRESENT INVENTION

1. Field of the Present Invention

The present invention relates generally to container security and, more particularly to a shipping container monitoring system to provide a non-intrusive and rapid inspection technique for short term interaction with a shipping containers.

2. Description of Related Art

Shipping containers are used to transport most of the commerce entering, leaving, and transiting within the United States. It is estimated that there are over 6 million containers moving in global commerce. Shipping containers have revolutionized the transportation of goods by greatly reducing the number of times goods must be loaded and unloaded during transportation. However, at the same time, this same advantage has created a major problem in that it is very difficult to monitor and track the contents of each container during transport.

Today, the vast majority of non-bulk cargo is transported in Intermodal containers. The containers arrive at a port by truck, rail or another ship and are stacked in the port's storage area. When a containership arrives in port, the ship is offloaded by a crane. Once unloaded, the containers either leave the port by truck or rail or they are put in the storage area until they are put on another ship. To be loaded onto another ship, the containers are brought to the dock by truck. A crane lifts the containers from the trucks into the ship. As the containers pile up in the ship, the workers connect them to the ship and to each other.

In today's security conscious transportation environment, there is a strong need to cost-effectively and accurately monitor the contents of containerized shipments. This need exists both in the United States and abroad. However, monitoring the content of shipping containers is difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the Unites States.

SUMMARY OF THE PRESENT INVENTION

The present invention takes advantage of the transitional stages of the loading and offloading process and discloses an apparatus capable of non-intrusively scanning the cargo container at these transition points to establish a risk profile pertaining to each container. The present invention includes a number of small lightweight sensors that are attached to the sides of a gantry crane spreader bar, the frame of a truck bed, or stand-alone unit at entry points that are directionally positioned to create a target zone. The target zone is designed to be in close proximity to the container as it is loaded or offloaded from a truck, ship, or rail. Embodiments of this system include stand alone applications, as well as configurations to interface with new or existing processing systems, sensor suites, and communication devices and means. Data gathered would create a risk profile during transit. Deviations in the data from checkpoint to checkpoint would be used to pinpoint and prioritize which specific containers should undergo a complete inspection. The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
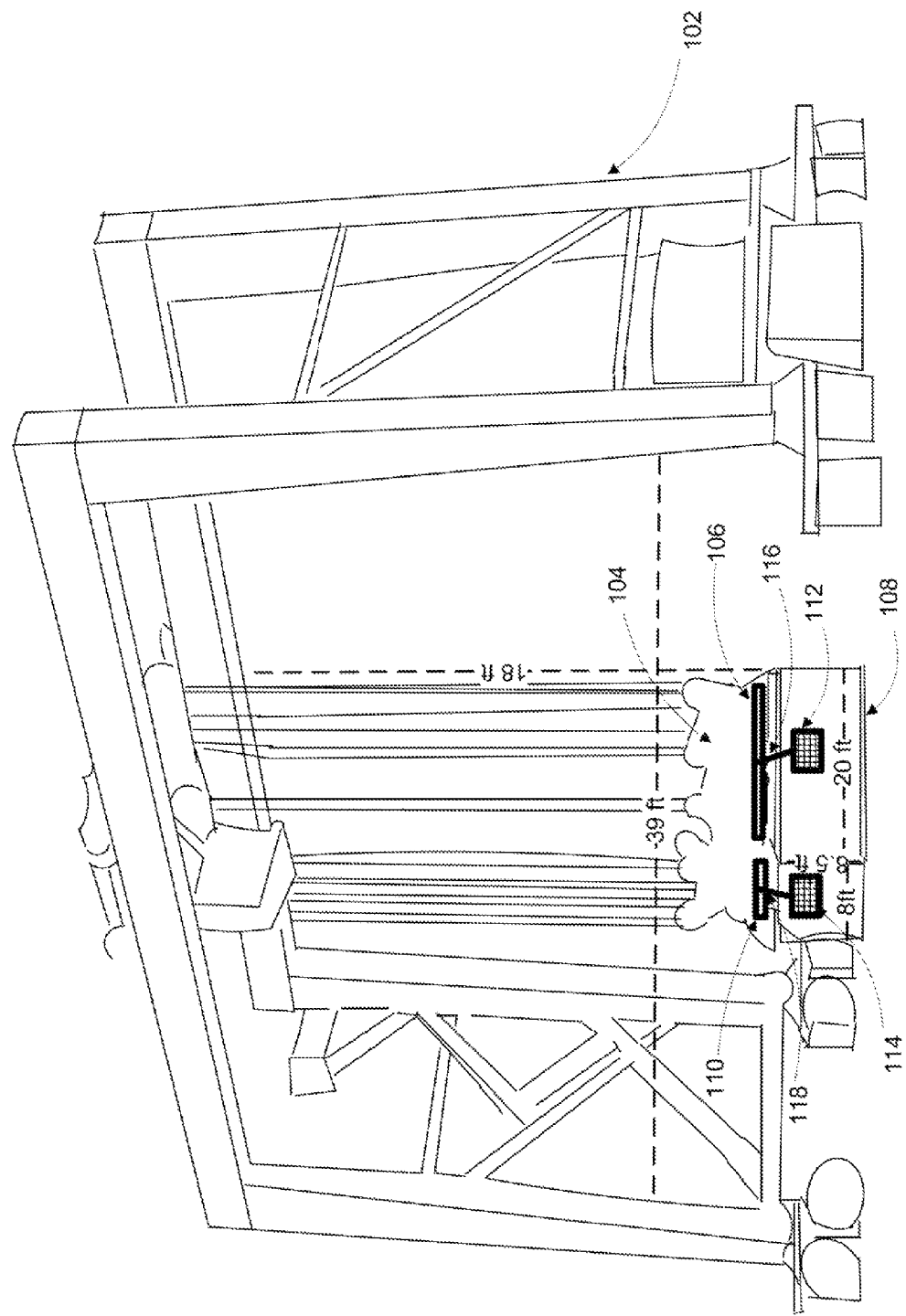
FIG. 1 shows a container in proximity to a crane assembly with sensors attached to spreader bar of crane in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can, include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

All dimensions as shown in the figures and described in the specification have been selected to simplify explanations. However, it is understood that there are many variables in the sizes and dimensions of cargo containers, cranes assemblies, transport vehicles, storage areas and loading docks that must be taken into consideration by one skilled in the art when adapting the present invention.

A portal based scanning apparatus includes a number of small lightweight sensors that are attached to the sides of a gantry crane spreader bar, the frame of a truck bed, or stand-alone unit at entry points. The sensors are directionally positioned to create a target zone. The target zone is designed to be in close proximity to the container as it is loaded or offloaded from a truck, ship, or rail. A plurality of sensors may be deployed either separately or in a group within one or more panels. In a preferred embodiment, a portal based scanner includes a network element and one or more scanner panels. One or more sensors are deployed on each panel. Each scanner panel can be attached to a fixed location on a structure, or retractably attached to the structure.

With reference now to FIG. 1, a container in proximity to a crane assembly with portal-based scanner sensor panels attached to the spreader bar of the crane in accordance with an embodiment of the present invention will now be discussed. As shown in FIG. 1, a cargo container 108 in close proximity to the spreader bar crane assembly 104 of a Rubber Tire Gantry Crane (RTGC) 102. As shown, the dimensions of the cargo container 108 are 20 feet long by 8 feet wide by 8.5 feet high and the dimension of the inner span of the RTGC 102 is 39 ft. The RTGC 102 is capable of lifting the cargo container 108 to a height of 18 feet. As further shown in FIG. 1, two sensor panels 112, 114 are attached on two sides of the cargo container 108 that extend and retract via the hydraulic cabling system 116, 118 from a system of track 106,110 attached to structural framework of the crane assembly spreader bar 104. The portal-based scanner sensor panels are deployed when the spreader bar is fully engaged and they may be configured to perform a 30-40 second scan of the length of the container. In this way, the portal-based scanner apparatus is able to complete a close proximity, nonintrusive scan which creates or updates a risk profile for the container 108. One or more scanner sensor panels are employed to scan each container. Preferably, there are at least two scanner panels employed to scan each container and in some embodiments depending on the amount of time and the size of the containers, more than two scanner panels will be necessary.

According to one aspect of the present invention, the portal based scanner may preferably automatically detect a container entering the target zone. When a container enters the target zone, the portal based scanning is started manually, or triggered by the auto detection via at least one sensor from one scanner panel. Furthermore, a scanner panel is preferably capable of detecting relative movement between the panel and a container being transported. In one embodiment, the portal based scanner completes a full length scan of a container as the container passing through the target zone created by the scanner panels. In another embodiment, the portal based scanner completes a full length scan of the container by moving at least one scanner panel.

Figure 2:
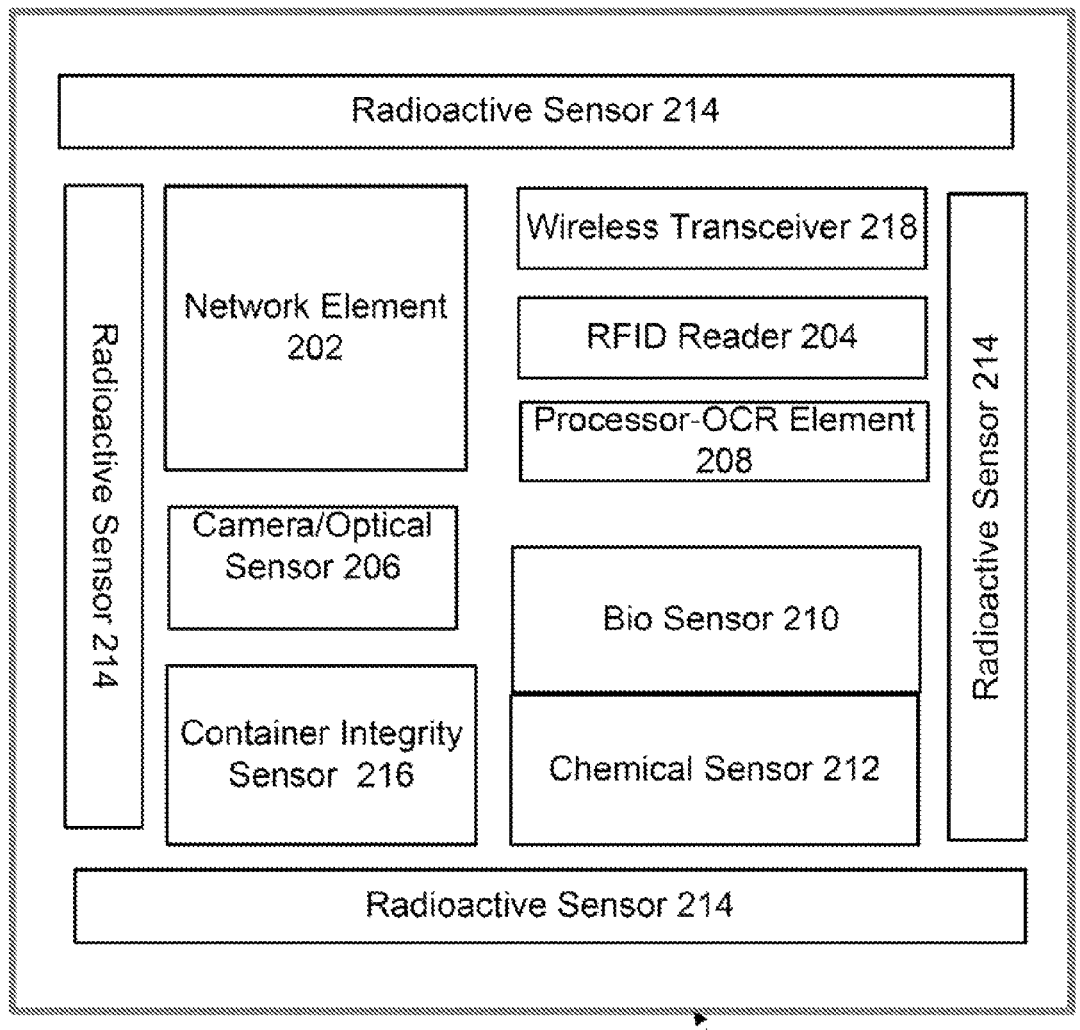
FIG. 2 shows a block diagram of the components of a portal-based scanner in accordance with an embodiment of the present invention.

With reference now to FIG. 2, a block diagram of the components of a portal-based scanner in accordance with an embodiment of the present invention is provided. As shown in FIG. 2, a portal-based scanner 112, may preferably include: a plurality of sensors and a network element 202 which is communicatively coupled-via cabling, a wireless communication link via wireless transceiver 218, and/or other communication link to each sensor. As shown, the exemplary sensor suite of the portal-based scanner 112 may further include: a RFID reader 204; a-processor-OCR element 208; a camera/optical sensor 206; a container integrity sensor 216; a bio sensor 210; a chemical sensor; and an array of radioactive isotope sensors 214. The radioactive isotope sensors 214 may detect gamma radiation and neutrons. The container integrity sensor 216 may further include an infrared spectroscopic sensor or a passive ultrasonic technique. The Bio Sensors 210 and Chemical Sensors 212 may include an optical chemical/biosensor, optical, electrochemical, piezoelectric, or volt metric sensors.

The network element 202 includes a data collecting system and an information processing system with data communication interfaces that collect signals from the sensor units. The collected signals represent detailed data from each sensor device. A user interface allows remotely located service or supervisory personnel to operate the local system and to monitor the status of the shipping container verification by the collection of sensor units deployed on a portal-based scanner.

According to a further aspect of the present invention, the portal-based scanner is preferably capable of interrogating containers to determine whether a container is a smart container or not (i.e. whether the container has enhanced monitoring capabilities). If a container is a smart container, then processing system and interfacing unit will further interrogate sensors or a container level processor within the smart container to quickly identify and assess the status of the container. If the container makes no response when interrogated, the portal-based scanner will assume that the container is not actively monitored ("dumb") and it will proceed to identify the container via optical sensors 206 and assess the condition of the container via container integrity sensor 216.

For a smart container, continuous monitoring throughout the journey can be enabled via a container level processor and the sensors on the container body structure. During long-term events, such as travel or storage, the container level processor may preferably collect data from the sensors located on the container. To conserve battery power or save satellite communication cost, the container level processor may not always report this data to a monitoring center during the long-term events. The container level processor may continuously collect data, organize data, and generate a long-term report. When the container is placed under a portal based scanning, through a handshaking protocol, the long-term report may then be sent to the data fusion center via the portal based scanning apparatus.

When the smart container is placed in the target zone created by the portal based scanner apparatus, the portal based scanner first determines that it is a smart container. The portal based scanner may further interrogate any available data report from the smart container, or the container level processor may initiate a communication with the portal based scanner. In a preferred embodiment, the portal based scanner apparatus may scan the smart container and gather data regarding the current condition of the smart container; further, during the same scanning process, the portal based scanner apparatus may communicate with the smart container and retrieve any available long-term report from the container level processor. Via the network element of the portal based scanner, the long-term report and the current scan data may be transmitted to the data fusion center by the portal based scanner. The container level long-term report and the current scan data may be analyzed together to identify anomalies.

The present invention may be mounted to fit a plurality of pieces of equipment such as but not limited to: a Rail Mounted Gantry Crane, a hook crane, a stewing/luffing crane, a magnetic crane, transport vehicles, security checkpoints, and entrances and exits in storage yards.

Figure 3:
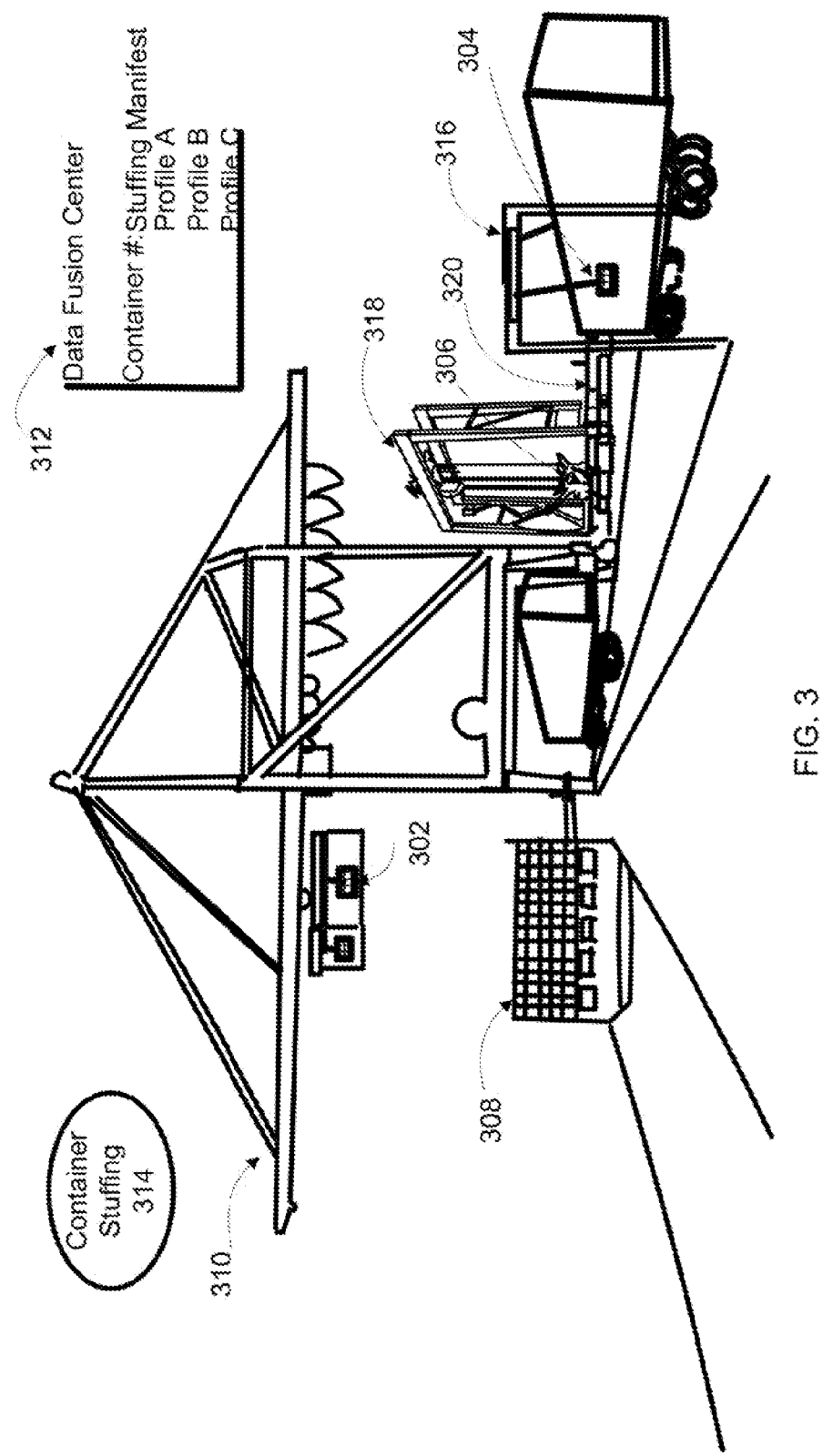
FIG. 3 shows a functional configuration of an exemplary placement of scanners associated with an inspection system in accordance with an embodiment of the present invention.

With reference now to FIG. 3, a functional configuration of an exemplary placement of scanners associated with an inspection system in accordance with an embodiment of the present invention will now be further discussed. As shown, a portal-based scanner 302 may be secured and retractably attached to the spreader bar of a large dockside gantry crane 310 found at container terminals for loading and unloading intermodal containers from ships gathers data about each container as it offloads containers. In this way, the portal-based scanner of the present invention may gather data about each container as they are offloaded. Preferably, the retractable portal-based scanners are sized and stored in such a way that they will not obstruct normal operations of container loading/offloading and hauling equipment. The collected data is preferably transmitted to a Data Fusion Center 312 where a risk profile is created and compared to the container's stuffing manifest 314 and other profiles for the same container.

As further shown in FIG. 3, the portal-based scanner 306 may be secured and retractably attached to the spreader bar of a Rubber Tire Gantry Crane 318 used for stacking intermodal containers within the stacking areas of a container terminal. RTGCs are used at container terminals and container storage yards to straddle multiple lanes of rail/road and container storage, or when maximum storage density in the container stack is desired. As with the configuration discussed above, the portal-based scanner 306 preferably gathers data about each container as they are transferred and stacked in the storage yard 320. Thereafter, the data collected is preferably transmitted to the Data Fusion Center 312 where a risk profile is created and compared to other profiles for each specific container.

As further shown in FIG. 3, a portal-based scanner 304 may also be secured and retractably attached to the structural frame of the security gate 316 of the storage yard or a work platform. In this configuration, the portal-based scanner 304 may interrogate and collect data about each container that enters or exits the storage yard or the work platform and it may thereafter transmit the data to the Data Fusion Center 312 where a risk profile is created and compared to the manifest and other risk profiles for that specific container.

A portal-based scanner 304 may also be secured and retractably attached to the structural frame of a transport vehicle. In this configuration, the portal-based scanner 304 may interrogate and collect data about each container being attached to or detached from the transport vehicle, and it may thereafter transmit the data to the Data Fusion Center 312 where a risk profile is created and compared to the manifest and other risk profiles for that specific container.

Any deviation in scanner test results for a given container increases the risk quotient which will identify a container for inspection. Preferably, port authorities or other inspecting authorities are alerted by the risk quotient variation associated with a specific container and the "at risk" container may be scheduled for complete inspection either within the storage yard area or another area where authorities are operating.

Preferably, the portal-based scanners can be manually and/or automatically programmed to adjust the settings of the length of the operation of the scanner based on how much time a specific interaction event with the container takes and the size of the container.

Communication System

In accordance with a preferred embodiment of the present invention, the reporting may be made via a wireless connection to a satellite mode to communicate with a satellite system such as Globalstar™ or Orbcomm™. Preferably, such a satellite device will be a device such as the Axxon™, AutoTracker™, or the like, or a customized Orbcomm™ VHF satellite GPS tracking communications device which may be adapted with Zigbee™ interface antenna devices to incorporate them into the overall LAN architecture of the security system; these devices include a satellite transceiver, GPS receiver, a customized Zigbee™ wireless antenna with a serial (Ax Tracker™) or duplex (OrbComm™) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee™ (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to, and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support.

In terms of decision making, such a data fusion center would assist agents and shippers in making decisions regarding the safety and status of each container. In short, such a data fusion center would preferably provide a consolidated source of information that could be used to assist agencies and shippers to identify and remove unsafe and suspicious containers from commerce.

What is claimed is:

1. A portal based scanner apparatus for automatically scanning shipping containers at transitional stages, the apparatus comprising:
   a sensor suite;

a network element communicatively coupled with the sensor suite; wherein the sensor suite comprises a plurality of sensors; and further wherein, the plurality of sensors are deployed on one or more scanner panels;

an RFID reader, wherein the RFID reader is configured to detect and interrogate RFID tags; and a processor, wherein the processor is configured to initiate a scan of a shipping container by one or more sensors;

further wherein the processor is further configured to determine whether the scanned shipping container includes a container level processor; wherein, the processor is further configured to initiate a first scanning process when a container level processor is detected and a second scanning process when a container level processor is not detected;

wherein the first scanning process comprises interrogating the detected container level processor to provide data produced by sensors within the shipping container; wherein the first scanning process further comprises interrogating specific sensors within the shipping container; and further wherein, the second scanning process comprises scanning the outside of the shipping container with an optical sensor or a container integrity sensor.

2. The apparatus of claim 1, wherein at least one scanner panel is directionally positioned to create a target zone in close proximity to a transported container.

3. The apparatus of claim 2, wherein the portal based scanner automatically detects a container entering the target zone.

4. The apparatus of claim 1, wherein at least one scanner panel is capable of being automatically extended and retracted.

5. The apparatus of claim 1, wherein at least one of the scanner panels is attached to structural framework of a crane.

6. The apparatus of claim 5, wherein the portal based scanner apparatus is capable of interrogating and collecting data from a container that is being handled by the crane.

7. The apparatus of claim 1, wherein at least one scanner panel is attached to a structural frame of a security checkpoint, a security gate, an entrance, an exit, a work platform, or a transport vehicle, further wherein the portal based scanner apparatus is capable of interrogating and collecting data from a container passing through a security checkpoint, a security gate, an entrance, an exit, or a work platform, or being attached to or detached from a transport vehicle.

8. The apparatus of claim 1, wherein the portal based scanner apparatus is capable of interrogating sensors within a smart container to identify and assess the status of the smart container.

9. The apparatus of claim 1, wherein the portal based scanner apparatus is capable of communicating with a container level processor within a smart container to retrieve a long-term report.

10. The apparatus of claim 1, wherein the network element further comprises a user interface that allows supervisory personnel to operate the portal based scanner apparatus.

11. The apparatus of claim 1, wherein the portal based scanner apparatus is capable of reporting data regarding a transported container to a data fusion center.

12. The apparatus of claim 1, wherein at least one scanner panel is capable of being programmed to adjust settings of scanning operation based on how much time a specific interaction event with a container takes or the size of a container.

13. The apparatus of claim 1, wherein the portal based scanner apparatus further comprises an additional communication interface to add one or more additional sensors, readers, or controllers.

* * * * *